DONALD B. MAC LEOD &
ARNOLD MACKLIN
INVENTORS

BY Robert G. Clay

ATTORNEY

DONALD B. MAC LEOD &
ARNOLD MACKLIN
INVENTOR.

BY Robert G. Clay

ATTORNEY

DONALD B. MAC LEOD &
ARNOLD MACKLIN
INVENTOR

BY Robert S. Clay
ATTORNEY 3,450,832
ELECTRONIC EDITING SYSTEM FOR HELICAL SCAN VIDEO TAPE RECORDER Donald B. MacLeod, Woodside, and Arnold Macklin, San Jose, Calif., assignors to Ampex Corporation, Redwood City, Calif., a corporation of California Filed Jan. 3, 1966, Ser. No. 518,408
Int. Cl. H04n 5/78
U.S. Cl. 178—6.6 6 Claims

ABSTRACT OF THE DISCLOSURE

An electronic editing system for helical scan video tape recorders. The system includes means for selectively energizing video record head means with desired video signals when predetermined points of an existing video tape recording are adjacent the head means. Means are also provided for selectively energizing a video erase head disposed upstream from the record head and adjacent the tape. Means are further included to selectively de-energize the video head means in predetermined delayed relation to the energization of the erase head. The system also incorporates means for maintaining the capstan and head drum servos of the recorder in a playback mode during recording of the new signal or selectively recording a control track on the tape which is in synchronism with both the original and new recorded signals. Appropriate correlated action of the foregoing means to conduct various editing operations may be effective by logic circuitry means associated therewith and controlled by an editing mode selector.

This invention relates generally to the editing of video signals recorded on magnetic tape, and is more particularly directed to an electronic editing system for helical scan video tape recorders.

The editing of helically scanned video tape recordings has heretofore been accomplished mechanically. The tape has been cut and tape segments spliced together to provide an edited tape. Aside from the physical disadvantages encountered in carrying out such a mechanical editing procedure, it is virtually impossible to provide entirely smooth tape edges at a splice. Inasmuch as helical scan recorders usually depend on edge guidance of the tape during record and playback scanning operations, some picture disturbance is typically produced in the reproduced image due to edge irregularity at a mechanical splice.

Substantial advantages are to be gained by providing for the electronic editing of helical scan video tape recordings. Electronic editing is accomplished in a substantially automatic and rapid manner while the tape is in motion at normal speed. Moreover there is no edge irregularity at an electronic splice. Although electronic editing has long been employed in the editing of transverse scan video tape recordings, a simple extension of the existing procedure to helical scan recordings has not been possible because of the difference in the geometries of the recorded signals. The recorded tracks of a transverse scan recording are only slightly slanted from the transverse direction and are therefore substantially vertical. A substantially vertically oriented erase head may thus be employed to initiate erasure of a selected segment of video information recorded on the tape. The erase head is positioned a predetermined distance in advance of the video heads. By employing a time delay corresponding to the time required for the tape to move the predetermined distance to program energization of the video heads with new video material, recording of the new material is initiated precisely at the start of the erased segment. However, the recorded tracks of a helical scan recording are substantially diagonal and at a substantial angle to the transverse direction. The tracks are consequently very long. Initiation of erasure of a tape segment in a guard band between tracks therefore cannot be effected by means of a vertically oriented erase head. The use of a diagonally oriented erase head is impractical because of the substantial length and critical positioning of the head that would be required. It will be thus appreciated that the principles of electronic editing which have been so effectively applied with transverse scan video tape recordings are not applicable to helical scan recordings.

It has been found that electronic editing of helical scan video tape recordings may be accomplished in the manner disclosed in a copending application of Norman F. Bounsall, Ser. No. 518,454, for Radio Frequency Erasing Method for Video Tape Recordings, and assigned to the assignee of the present application. Briefly, said copending application discloses a method of erasing an existing video signal recorded on a magnetic tape while simultaneously recording a new video signal on the erased portion of the tape, without the use of an erase head. More particularly, in accordance with the method, a new video signal is recorded directly over an existing video signal recorded on a magnetic tape, while close registration between the radio frequency carriers of the respective signals is maintained. This is accomplished by maintaining the capstan and head drum servos of video tape recording and reproducing apparatus in a playback mode while the video electronics of the apparatus are switched from the playback to the record mode to initiate recording of a new video signal over the previously recorded signal. A high degree of erasure of the existing signal is thereby obtained by over-recording of the new signal, and only a slight tolerable amount of radio frequency interference appears upon reproduction of the new signal. The copending application also discloses the employment of the method in conjunction with complete erasure of tape by a video erase head disposed upstream from the head drum of helical scan video tape recording and reproducing apparatus in the conduct of a long insert editing operation, i.e., an insert occupying an area of tape greater than the distance between the video erase head and head drum. In this regard, the video electronics are switched to the record mode substantially simultaneously with energization of the video erase head. Initially, the new signal is recorded directly over the existing signal, and a slight amount of interference is thus contained therein. Thereafter, the recorded tracks of the new signal are on progressively increasing amounts of tape completely erased by the erase head, and finally entirely on completely erased tape. The interference thus rapidly decreases to zero. A short insert editing operation, i.e., an insert occupying an area less than the distance between the video erase head and head drum, is conducted without erasure by the erase head, merely by over-recording of the new signal on the existing signal.

It is of course desirable that long insert, short insert, and other electronic editing operations in accordance with the basic method outlined above be selectively conducted in an automatic manner under the control of an operator.

It is therefore an object of the present invention to provide an electronic editing system for helical scan video tape recorders arranged to automatically conduct any of a number of different selected editing modes under the control of an operator.

Another object of the invention is the provision in a helical scan video tape recorder of an electronic editing system which enables video signal subject matter to be inserted in, or added to an existing tape recording, facilitates assembly on a master tape, etc., with precision and minimal disturbance at the edited transitions.

Still another object of the invention is to provide a helical scan video tape recorder electronic editing system with which time base continuity is maintained at the edited transitions for all of the selectable editing modes thereof.

It is yet another object of the invention to provide an electronic editing system of the class described having means for visually indicating the conduct of the selectable editing modes thereof.

A further object of the invention is the provision of an electronic editing system of the class described which is arranged to prevent the inadvertent occurrence of blank spots in the edited recording.

Additional objects and advantages of the invention will become apparent upon consideration of the following description in conjunction with the accompanying drawings, wherein.

Figure 1:
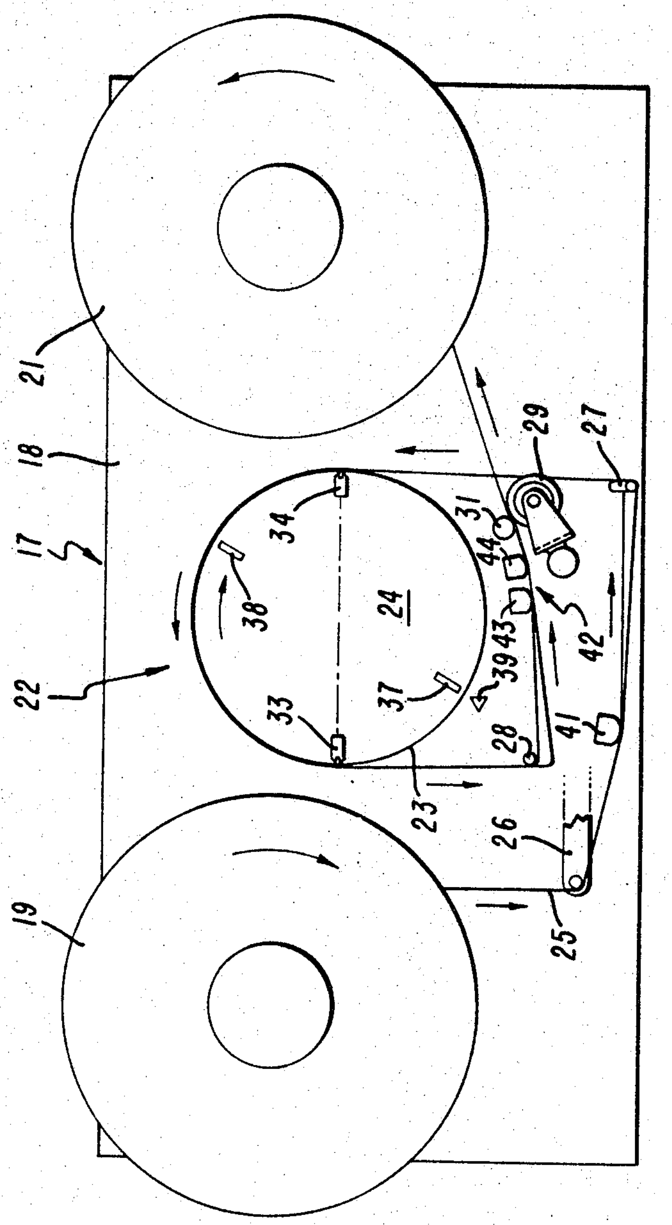
FIGURE 1 is a plan view of conventional helical scan video tape recording and reproducing apparatus of a type with which the electronic editing system of the present invention is employed.

In accordance with the basic aspects of the invention, an electronic editing system is provided for employment with helical scan video tape recorders to facilitate the selective addition of new video program material at predetermined points of an existing video tape recording with continuity between the respective signals. The editing system includes means for selectively energizing the video record head or heads of a helical scan video tape recorder with desired video signals when predetermined points of an existing video tape recording are adjacent the head. Means are also provided for selectively energizing a video erase head of the recorder disposed transverse to the tape at a position upstream from the video head drum substantially simultaneously with energization of the video heads. The system is provided with means to selectively de-energize the video heads in predetermined delayed relation to de-energization of the video erase head in order that termination of the recording of the new video signal may be accomplished without leaving an erased gap on the tape. Further included are means for maintaining the capstan and head drum servos of the recording and reproducing apparatus in a playback mode during recording of the new signal, or selectively recording a control track on the tape which is in synchronism with both the previously recorded and added signals. This enables the new signal to closely track the old such that erasure of the old signal is effected simultaneously with recording of the new signal in accordance with the method of the previously referenced copending application Ser. No. 518,454. The maintenance of correct timing at edited transitions between recorded signal segments is also thereby facilitated. Appropriate correlated actuation of the foregoing means to conduct various editing operations is effected by means of logic circuitry associated therewith and controllable by an editing mode selector switch and an edit record switch. The selector switch has selectable "normal," short insert," "long insert," and "assemble" mode positions. Placement of the selector switch in the "normal" position decouples the logic circuitry from the recorder to disable the editing system and thereby enable the recorder to be used for its normal recording and playback operations.

When the selector switch is placed in the "short insert" position, the logic circuitry is appropriately interconnected by such switch to effect a "short insert" editing operation in response to actuation of the edit record switch. In response to a first actuation of the edit record switch, the video record section of the video electronics is switched on to energize the video heads with a new video signal for recording on the tape. The capstan and head drum servos are responsively maintained in a playback mode such that the new signal closely tracks the existing signal during recording over the latter. Responsive to the next actuation of the edit record switch, the logic circuitry effects de-energization of the video record section to thereby terminate the "short insert."

With the mode selector switch in the "long insert" position, the switch interconnects the logic circuitry to effect a "long insert" editing operation upon actuation of the edit record switch. The video record section is energized and the capstan and head drum servos are maintained in the playback mode as in the case of a "short insert." The logic circuitry also effects energization of the video erase head substantially simultaneously with energization of the video record section. An in-going splice is thus effected wherein a partial, yet high degree of erasure of the existing signal is initially provided by recording of the new signal directly thereover, and progressively thereafter the new signal is recorded on tape completely erased by the video erase head. When the edit record switch is next actuated, the logic circuitry responsively effects de-energization of the video erase head. After a time delay equal to that required for the tape to move the distance between the erase head and head drum, the video record section is de-energized to thereby terminate recording of the new signal on the tape. The out-going splice thus effected is essentially an inverse counterpart of the in-going splice.

When the edit mode selector switch is in the "assemble" position, the logic circuitry is conditioned to conduct an "assemble" editing operation in response to actuation of the edit record switch. The first actuation of the switch triggers the logic circuitry to effect substantially simultaneous energization of the video record section and video erase head. At the same time, the logic circuitry effects writing of a new control on the tape. In this latter regard, the error signal normally employed to control the capstan servo in the playback mode of the apparatus is decoupled from the input of this servo and a constant signal commensurate with nominal tape speed is applied thereto. Simultaneously, the control track head is switched to the record state and coupled in receiving relation to the head drum tachometer. The control track head thus records the tachometer pulses on the tape as a new control track for controlling tape position during playback of the new video material. In this manner, phase match between the original control track and start of the new control track is obtained. When the edit record switch is next energized, the logic circuitry simultaneously de-energizes the video record section and video erase head and switches the capstan servo and control track head to their original playback conditions.

When the edit mode selector switch is in any of the foregoing positions, the logic circuitry concurrently effects switching of the audio record section of the apparatus to erase portions of the original audio tracks and record audio signals thereon associated with the new video material being recorded.

Figure 2:
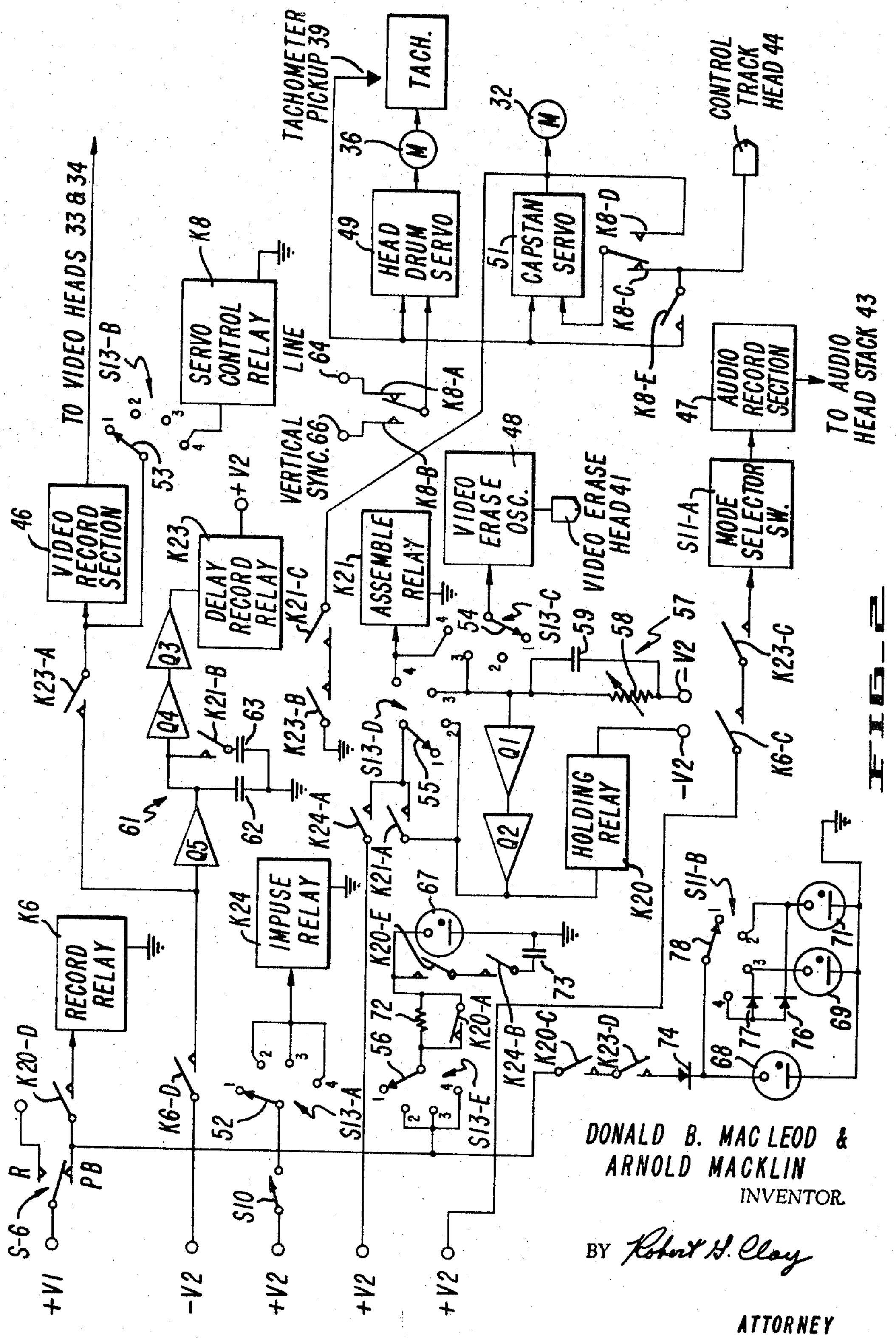
FIGURE 2 is a schematic circuit diagram of the electronic editing system.

Considering now a preferred arrangement of helical scan magnetic video tape recording and reproducing apparatus, and electronic editing system of the type generally outlined hereinbefore, reference is made to FIGURES 1 and 2 which respectively illustrate the apparatus and associated editing system. The recording and reproducing apparatus is generally conventional and depicted by the numeral 17. The apparatus includes a deck 18 upon which supply and takeup reels 19 and 21 are mounted for rotation at longitudinally spaced positions. Intermediate the supply and takeup reels there is provided a helical scanning assembly 22, which, in the illustrated case, includes a hollow cylindrical guide 23 having a rotary head drum 24 mounted therein. A magnetic tape 25 extends from the supply reel, around a tension adjusting arm 26, and an entrance guide pin 27, to the scanning assembly. The tape thereat extends in a helical wrap substantially 180° about the cylindrical guide 23 and then about an exit guide pin 28, and between a capstan 29 and pinch roller 31, onto the takeup reel 21. A motor 32 (see FIGURE 2) is coupled in driving relation to the capstan in order to effect movement of the tape between the supply and takeup reels in a helical wrap about the guide 23 of the scanning assembly. In addition, motors (not shown) are coupled to the supply and takeup reels to effect dispensing and takeup of the tape pulled by the capstan. A pair of video RF heads 33 and 34 are carried at diametrically opposed points of the drum 24 adjacent the periphery thereof, and a motor 36 (see FIGURE 2) is coupled in driving relation to the drum to rotate same in opposition to the direction of tape travel about the cylindrical guide 23. Thus, during each 180° of revolution of the head drum, one or the other of heads 33 and 34 scans diagonally across the helically wrapped tape to record a playback one complete track thereon. One head enters the tape at substantially the instant the other head leaves the tape. Two tracks are thus scanned each revolution of the drum. In addition, diametrically opposed magnetic slugs 37 and 38 are embedded in the drum at positions appropriately angularly displaced from the heads and located relative to a tachometer pickup head 39 such that a tachometer pulse is generated by this head each time one of the record heads commences scanning a track of the tape. The tachometer pulses are representative of the actual position of the head drum and are employed in a conventional manner to facilitate servo control of the head drum and capstan in the attainment of a high degree of time base stability in the reproduced signal.

There is also provided on the deck 18, a video erase head 41 at a point adjacent the tape 25 upstream from the scanning assembly 22, i.e., a point displaced from the scanning assembly in the direction of the supply reel 19. The video erase head is mounted adjacent the tape path to extend transversely across the central portion of the tape which contains the diagonal video tracks. A head stack assembly 42 is mounted on the deck at a position downstream from the helical scanning assembly 22, i.e., at a point intermediate the scanning assembly and takeup reel 21. The head stack assembly 42 includes an audio head stack 43 arranged to selectively record or play back audio tracks longitudinally along one edge of the tape. The head stack assembly also includes a control track head 44 (see FIGURE 2) for recording or playing back a control track longitudinally along the other edge of the tape.

Considering now the preferred circuit arrangement of the editing system illustrated in FIGURE 2, it is first to be noted that the recording and reproducing apparatus 17 conventionally includes a video record section 46, an audio record section 47, a video erase oscillator 48, a head drum servo 49, and a capstan servo 51. The video and audio record sections are respectively coupled to the video RF heads 33 and 34 and to the audio head stack 43, while the video erase oscillator 48 is coupled to the video erase head 41. Video and audio signals are supplied to the RF heads 33 and 34 and to the audio head stack 43 from the record sections 46 and 47 in response to the application of bias thereto. The video erase head is supplied with erase current in response to the application of bias to the erase oscillator 48. The head drum servo 49 is connected in controlling relation to the head drum motor 36, and the capstan servo 51 is connected in controlling relation to the capstan motor 32. In this regard, the servos develop motor controlling error signals by comparing tachometer pulses generated by the tachometer pickup head 39 to various selectable references that depend upon the functional mode to be conducted by the apparatus 17. The apparatus 17 includes means (not shown) for appropriately correlatively energizing the various elements of the recording and reproducing apparatus to conduct such functional modes in accordance with settings of a functional mode selector switch S–6. The switch includes playback and record contacts, as well as other contacts which are herein omitted for the sake of simplicity, engageable by a selector energized with a bias voltage +V1. The bias +V1 is thus applied to the selected switch contact to responsively actuate circuitry (not shown) for controlling the elements of the recording and reproducing apparatus to conduct the corresponding functional mode. For example, when the switch S–6 is the record position with its selector engaging the record contact, the video erase head 41 is responsively energized with erase current and the video and audio record sections are energized with signals to be recorded. Simultaneously the head drum and capstan servos are energized with suitable error signals for regulating the speeds of the head drum and capstan substantially constant. The control track head 44 is energized to record a control track on the tape.

When the switch S–6 is in the playback position with the selector engaging the playback contact, the video erase head is de-energized and the video RF heads 33 and 34 and audio head stack 43 apply the off-tape signals to video and audio playback sections (not shown). The control track head 44 reads the control track recorded on the tape and the control track signal is employed to develop suitable error signals which are applied to the head drum and capstan servos to cause the head drum and capstan to track the positions thereof which existed during recording. These "normal" modes of operation are conventional in tape recording and reproducing apparatus and accordingly the means for effecting the modes in response to the settings of the switch S–6 are not detailed herein.

Considering now the edit mode selector switch and associated logic circuitry of the editing system in detail, it is to be noted that there is provided an editing mode selector switch S–13 having five banks designated A, B, C, D, E of four selectable contacts designated as positions 1, 2, 3, 4. Associated with each bank is one of a plurality of ganged selectors for contacting the contacts at positions 1, 2, 3, 4. The selectors at banks A, B, C, D, E are respectively designated by the numerals 52, 53, 54, 55, 56. The positions 1, 2, 3, 4 of the selector switch S–13 represent the "normal," "short insert," "long insert," and "assemble" editing modes of operation, and the contacts at these positions are connected to the logic circuitry which is arranged to conduct the various modes in an automatic manner. The selector 52 of bank S–13A is connected to a bias +V2 through an edit record switch S–10. When the edit record switch is actuated, the bias +V2 is applied by selector 52 to the selectable contacts to initiate events subsequently described.

The logic circuitry for conducting the various editing modes includes an impulse relay K–24 connected at one side to contacts 2, 3, and 4 of switch bank S–13A, and at the other side to ground. Thus, with switch S–13A in any of positions 2, 3, 4, the impulse relay is energized in response to actuation of the edit record switch S–10. The impulse relay is such that its contacts K–24A, K24–B are closed in respnose to a first energization of the relay, and opened in response to the next energization. In other words, the relay contacts are alternatively closed and opened in response to successive energizations effected by actuations of the edit record switch S–10. Impulse relay contacts K–24A connect the selector 55 of switch bank S–13D to the bias +V2. Contact 2 of bank S–13D is connected to a holding relay K–20 in turn connected to a bias —V2. Contact 3 of bank S–13D is connected to a time delay circuit 57 which is adjustable to establish a delay corresponding to that between the video erase head 41 and the point of the scaning assembly 22 at which the heads 33 and 34 begin scanning tracks on the tape. The circuit preferably includes a variable resistance 58 and parallel capacitor 59 connected between contact 3 of bank S–13D and the bias —V2. The junction between the resistance-capacitance combination and switch contact is coupled by series transistor stages Q1 and Q2 to the side of relay K–20 that is connected to switch contact 2. The contact 4 of switch bank S–13D is connected to an assemble relay K–21, in turn connected to ground. Contacts 4 of banks S–13D and S–13C are commoned, as are contacts 3 of these banks. The selector 54 of bank S–13C is connected to the bias input of video erase oscillator 48.

A normally open contact K–20D of the holding relay K–20 couples the playback contact of the selector switch S–6 to a record relay K–6, which is in turn connected to ground. A normally open contact K–6D of this relay is employed to couple bias −V2 to a delay circuit 61 arranged to provide a relatively short delay sufficient to permit stabilization of components of the video record section 46. The delay circuit 61 preferably includes a transistor amplifier stage Q5 connected to one side of a capacitor 62, the other side of which is connected to ground. A second capacitor 63 is connected in parallel with capacitor 62 through a normally open contact K–21B of the assemble relay K–21. The common juncture of capacitors 62 and 63 and the output of transistor stage Q5 is connected to the input of a transistor amplifier stage Q4 in turn driving a transistor amplifier stage Q3. The output of stage Q3 is connected in energizing relation to a delay record relay K–23, in turn connected to bias +V2.

A normally open contact K–23A of delay record relay K–23 is connected between contact K–6D and a bias input of the video record section 46, as well as the selector 53 of switch bank S–13B. Positions 1, 2, and 3 of this bank are unconnected, while position 4 is connected to a servo control relay K–8, in turn connected to ground.

A normally open contact K–6C of record relay K–6 in series with a normally open contact K–23C couple bias +V2 to a bank S–11A of an audio mode selector switch S–11. Such switch bank is in turn appropriately connected to a bias input of the audio record section 47.

Considering now the manner in which the logic circuitry is connected to the head drum servo 49 and capstan servo 51, it is first to be noted that the tachometer pickup 39 is coupled to an input of each of these servos. The servo control relay K–8 is employed to control the application of comparison signals to second inputs of the servos. In this regard, a normally closed contact K–8A couples the second input of head drum servo 49 to a line sync source 64. A normally open contact K–8B couples the second input to a vertical sync source 66 from which the vertical sync signal of video information to be recorded is derived. The second input of the capstan servo 51 is coupled to the control track head 44 through normally closed contact K–8C, and to the capstan servo output through normally open contact K–8D. A normally open contact K–8E couples the control track head 44 to the tachometer pickup 39.

In order that an operator may visually ascertain the operation of the editing system, the logic circuitry includes an array of indicator lamps. In this regard, there are provided edit, video record, and channel one and channel two adio record lamps 67, 68, 69, and 71. In the event that the equipment includes only a single audio channel, only one audio record lamp would be provided. All lamps are of the neon or equivalent variety having a threshold potential that must be exceeded to effect breakdown and glowing of the lamps. The edit lamp 67 is energized by means of a circuit which includes switch bank S–13E. Position 1 of the bank is unconnected, while positions 2–4 are commonly connected to the playback contact of switch S–6. The selector 56 of bank S–13E is connected by a resistor 72 to the anode of the edit lamp 67, and the cathode thereof is connected to ground. A capacitor 73 is coupled in parallel with the lamp by means of a contact K–24B of impulse relay K–24 and normally open contact K–20E of holding relay 20, in series. A normally closed contact K–20A of the holding relay shunts the resistor 72. It will be thus appreciated that when the switch bank S–13E is in any of the edit positions 2, 3, 4, the lamp 67 glows. At substantially the same recording of new information in an editing cycle is initiated, and during such recording, the edit lamp 67 flashes by virtue of K–20A opening and contact K–20E closing. At this time, capacitor 73 is periodically charged through resistor 72, and discharged through the lamp.

The anode of the video record lamp 68 is connected through a diode 74 and normally open contacts K–23D and K–20C in series to the playback contact of switch S–6, while the cathode of the lamp is connected to ground. Hence, when the delay record relay K–23 is energized and the new video information is being recorded on the tape, the video record lamp glows.

The audio record lamps 69 and 71 have their cathodes connected to ground and their anodes respectively connected to positions 2 and 3 of bank S–11B of the audio mode selector switch. Position 1 of the switch bank is unconnected and position 4 is commonly connected to the positive terminals of a pair of diodes 76 and 77 respectively having their negative terminals connected to positions 2 and 3 of the switch bank. The selector 78 of the switch bank is connected to the diode 74. Positions 1, 2, 3, and 4 respectively correspond to modes of "video only," "video+audio 1," "video+audio 2," and "video +audio 1 and 2." These modes correspond to various audio functions that are controlled in the audio record section 47 by similar selectable positions of audio mode selector switch bank S–11A. When selector 78 is in position 1, and the recording of a new signal commences, neither of the audio lights 69 and 71 glows, although video lamp 68 glows. This indicates that only the video portion of the signal is being recorded. In position 2, both the audio channel 1, lamp 71 and video lamp 68 glow to indicate that the video signal and channel 1 of the audio are being recorded. In position 3, both the audio channel 2, lamp 69 and video lamp 68 glow to indicate that the video signal and channel 2 of the audio are being recorded In position 4, audio channel 1 and audio channel 2, as well as the video lamp 68 glow to indicate that the video signal and both channels of audio are being recorded.

With the circuit provided as just described and the switch S–13 in position 1 (normal mode) no bias is applied to the editing circuit, position 1 of all banks of the switch being unconnected. The switch S–6 may thus be selectively placed in record, playback, and other positions (not shown) to effect various corresponding normal functional modes in the tape recording and reproducing apparatus 17 exuclsive of editing.

To conduct the "short insert" mode, the switch S–13 is placed in position 2 and the switch S–6 is placed in playback. When it is desired to start the short insert, the switch S–10 is momentarily closed. The impulse relay K–24 is thus momentarily energized. Contacts K–24A and B are closed resulting in energization of holding relay K–20. Contact K–20A opens and contact K–20E closes, thereby causing edit lamp 67 to flash. Contact K–20C closes to prime the energizing circuit of video lamp 68 for operation upon subsequent closure of delay record relay contact K–23D. Contact K–20D closes to energize record relay K–6 whereupon contacts K–6C and D are closed. The closed contact K–6D applies negative bias −V2 to transistor amplifier stage Q5 of delay circuit 51 which causes the capacitor 62 to charge through the amplifier stage to a level that turns on the stages Q4 and Q3 to energize the delay record relay K–23. Thus, after the charging time delay of capacitor 62, the contacts of the delay record relay K–23 are actuated. Contact K–23D closes to light video record lamp 68 and whatever of the audio lamps 69 and 71 designate the particular audio mode selected by switch S–11. Contact K–23A closes to apply operating bias to the video record section 46 whereby the new video signal is applied to the video heads 33 and 34 and recorded over the existing recorded diagonal tracks on the tape 25. Contact K–23 closes to apply operating bias to switch bank S–11A which in turn biases the audio record section 47 to conduct the appropriate mode of audio signal to the audio stack 43 for recording over the existing audio tracks on the tape. The servo control relay K–8 is unenergized during the above-noted functions. Consequently the signal applied to the head drum servo 49 for comparison and development of an error signal for controlling the head drum motor 36, are derived from the tachometer pickup 39 and the line sync source 64. The signals applied to the capstan servo 51 to develop an error voltage for driving the capstan motor 32 are derived from the tachometer pickup 39 and control track head 44. Thus, the tape recording and reproducing apparatus is in a playback mode and synchronized with the material originally recorded on the tape. Close registration between the radio frequency carriers of the existing recorded signal on the tape and the new signal being inserted is thus maintained. A high degree of erasure of the existing signal is thus obtained although some radio frequency carrier productive of interference in a tolerable amount remains.

To terminate the "short insert" the switch S–10 is momentarily closed to briefly energize the impulse relay K–24 whereupon contacts K–24A and B are opened. Openings of K–24B decouples the capacitor 73 from the edit lamp 67, thus terminating flashing thereof and causing same to glow steadily. Opening of contact K–24A de-energizes the holding relay K–20 to cause all of its contacts to return to their normal positions and terminate operation of the editing cycle.

It should be noted that the "short insert" mode is employed where the insert extends over a relatively short distance which is less than the distance of tape travel between the video erase and video RF heads. This mode is necessary since in the "long insert" mode, the video erase head would erase a portion of tape that would not reach the video RF heads until after the insert period was terminated.

Figure 3:
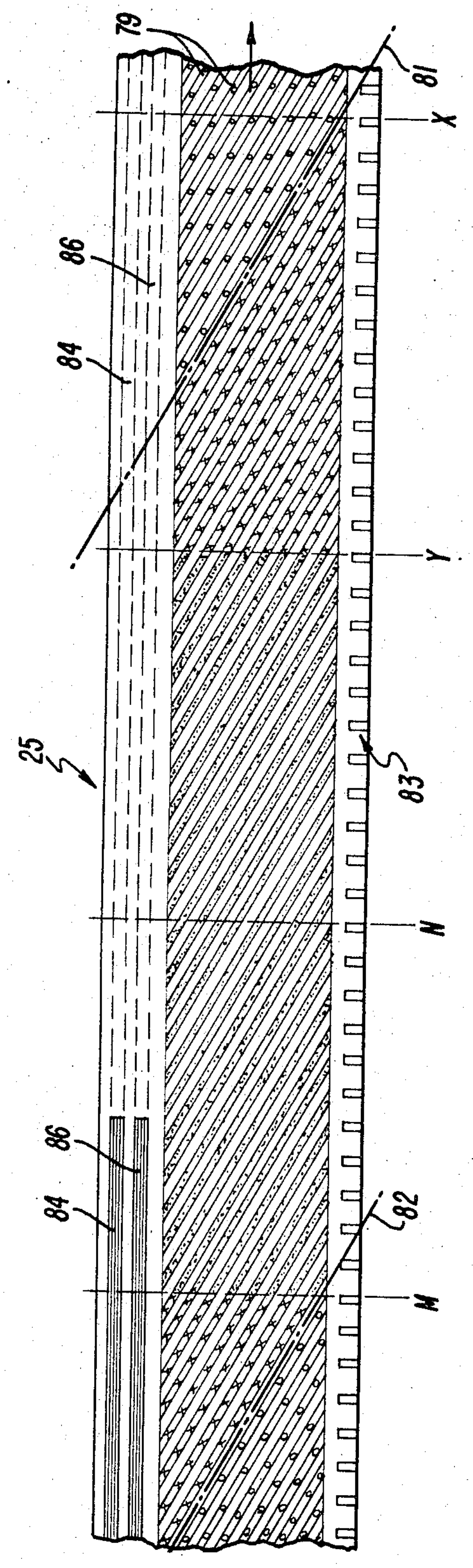
FIGURE 3 is a graphical representation of a long insert edited on magnetic video tape by means of the electronic editing system.

In order to carry out the "long insert" mode, the switch S–13 is placed in position 3 and switch S–10 is momentarily depressed to initiate the insertion of new video material in the existing material recorded on the tape. The impulse relay K–24 is energized and contacts K–24A and B close. Positive bias +V2 is applied through position 3 of switch bank S–13D to the delay circuit 57 and through position 3 of S–13C to the video erase oscillator 48. Erase current thus energizes the video erase head 41 such that erasure of the existing video tape signal is initiated at once. The bias applied to the delay circuit 57 is applied by transistor stages Q1 and Q2 to the holding relay K–20 and simultaneously instantaneously charges the capacitor 59. Energization of the holding relay causes the circuit to thereafter operate in the manner previously described with respect to the "short insert" mode. In the "long insert" mode, however, recording of the new video signal commences substantially simultaneously with the erasure of the signal at a point upstream from the head drum. An in-going splice is thus provided which is substantially as illustrated in FIGURE 3. A point X of the magnetic tape 25, having existing helically scanned recorded tracks 79 thereon, is the point of the tape that was positioned adjacent one of the video RF heads 33 or 34 at the instant of energization of the video record section 46 by closure of delay record relay contact K–23A. A point Y of the tape displaced upstream from point X is that which was positioned adjacent the video erase head 41 at the instant of energization of the erase oscillator 48 effected by closure of impulse relay contacts K–24A. In the figure, original video information recorded on the tape is represented by O's, new video information recorded over the original information and containing a slight amount of radio frequency carrier interference is represented by X's, and new video information recorded on tape completely erased by the erase head 41 is represented by dots. It is to be noted that a diagonal electronic in-going splice line 81 is provided that extends through the point X. On the downstream side of the splice line, the tape contains tracks of the original video signal. On the upstream side of the splice line there is provided a transition region X–Y containing tracks of the new video signal together with a slight amount of radio frequency interference that progressively diminishes to zero at point Y. A relatively small number of complete tracks in the initial portion of the transition region contain the slight amount of interference, whereas in the final portion of the transition region the segments of successive tracks containing interference become of progressively shorter lengths, diminishing to zero at point Y. The tracks upstream from point Y are complete tracks of the new signal recorded on completely erased tape. Thus, during playback of the transition region, a slight amount of radio frequency interference initially appears in the reproduced image of the new video signal immediately following the splice line, and thereafter rapidly progressively diminishes as a vertical tape.

To terminate the "long insert" the edit record switch S–10 is momentarily depressed to again energize the impulse relay K–24, whereupon the contacts thereof open. This effects immediate de-energization of the video erase oscillator 48 and termination of erasure of the video signal recorded on the tape. At the same time the edit light 67 stops flashing and glows steadily. However, the charge on capacitor 59 as applied by transistor stages Q1 and Q2 to holding relay K–20 maintains this relay energized until the capacitor discharges through variable resistor 58 to a sufficiently low value that the transistor stages are cut off. The delay time is set by adjustment of the variable resistor to correspond to the time required for the tape to travel between the video erase head and exit point from the head drum, at which time the editing cycle is terminated. The out-going splice thus effected is as illustrated in FIGURE 3. Point M represents the point of the tape that was adjacent the video erase head 41 at the instant of its de-energization, while point N is the point of the tape that was adjacent the scanning video RF head at this instant. The area of tape between transverse lines through points M and N is thus completely erased at the instant the video erase head is de-energized. However, by virtue of the previously noted delay, which corresponds to the time required for the tape to travel the distance N–M, the video RF heads continue to record the new video signal until point M is adjacent the scanning head. At this instant, the video record section 46 is de-energized and recording of the new video signal is terminated. Recording of the new video material thus continues to the point of the tape at which erasure was terminated, and therefore no blank spots are produced on the tape. An out-going electronic splice line 82 extends diagonally through point M, and complete tracks of the original recorded signal are provided on the upstream side of the splice line. Immediately downstream from the splice line there is a transition region which is an inverse counterpart of that of the in-going splice. In this regard, tracks which are not intersected by a transverse line through point M, in their entirely contain the new signal recorded on completely erased tape. However, tracks which are intersected by this transverse line are divided into two segments, one of which contains the new signal recorded on completely erased tape, and the other of which contains the new signal with a slight amount of radio frequency carrier interference. The lengths of the track segments containing interference progressively increase as point M is approached in the upstream direction. Thus, during playback of the transition region of the out-going splice a vertical wipe of interference is produced in the reproduced image in a direction opposite to the wipe produced during playback of the in-going splice. At the splice line 82, the interference abruptly terminates as playback of the original signal is resumed.

It is to be noted that before, during, and after the "long insert" the recording and reproducing apparatus 17 was maintained in a playback mode by the editing system. The capstan servo 51 controlled tape position in accordance with the control track 83 associated with the original video signal recorded on the tape. In addition, the audio tracks 84 and 86 were edited in response to switching of the audio record section 47 on and off by the logic circuitry in correlation with switching of the video record section. In FIGURE 3, the audio tracks associated with the original video signal are represented by solid bars while those associated with the new insert signal are represented by dotted bars.

With the edit mode selector switch S–13 in the "assemble" position (position 4), the new video material is automatically assembled at the end of the existing recording on the tape, responsive to momentary closure of edit record switch S–10. As in the instances of the other modes, the impulse relay K–24 is momentarily energized, thus closing contacts K–24A and B. The assemble relay K–21 is responsively energized through switch bank S–13D, and the video erase oscillator 48 is energized at the same time through switch bank S–13C. Erase current applied to the video erase head 41 thus commences to erase any recorded video signal existing on the tape in a region closely preceding the unrecorded portion of the tape.

Figure 4:
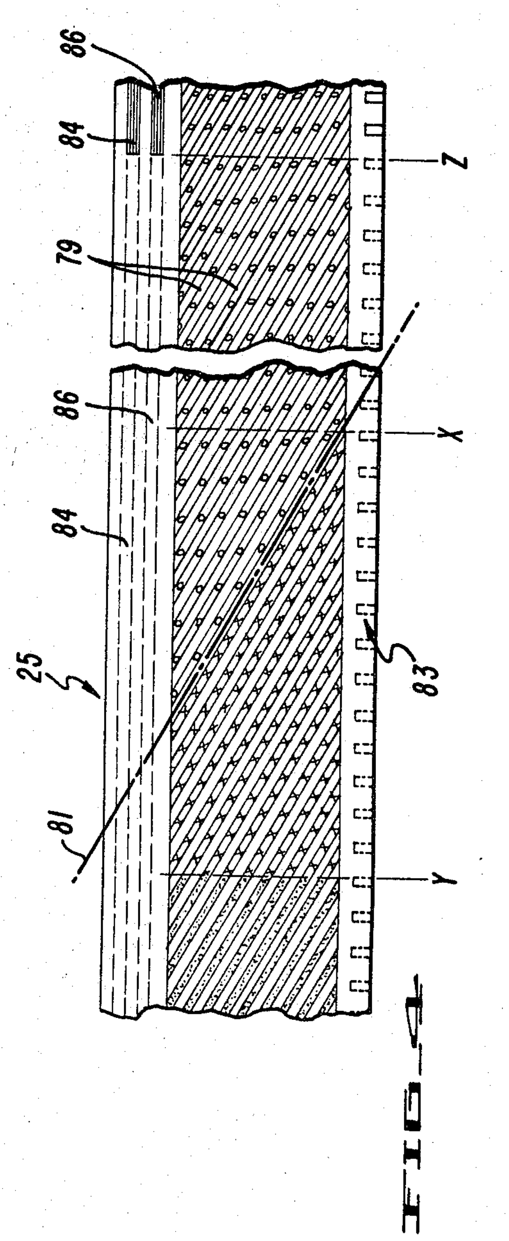
FIGURE 4 is a graphical representation of an assembly edited on magnetic video tape by means of the electronic editing system.

Energization of the assemble relay effects closure of its associated contacts. Holding relay K–20 is energized through contact K–12A. In the manner previously described, the contacts of this relay effect flashing of the edit lamp 67 and energization of the record relay K–6. The record relay functions, as noted hereinbefore, to energize delay record relay K–23 after a brief delay produced by delay circuit 61. The delay is longer in the instance of the "assemble mode" than in the "insert modes" by virtue of contacts K–21B placing capacitor 63 in parallel with capacitor 62. Energization of the delay record relay causes the video and audio record sections 46 and 47 to be energized, thus initiating the recording of new video and audio signals on the tape in a manner analogous to that described with respect to the in-going splice of the "long insert" mode. However, in the "assemble" mode, the servo control relay K–8 is now also energized through position 4 of switch bank S–13B. Contact K–8A opens and contact K–8B closes to thereby apply vertical sync from the new video signal as a reference to head drum servo 49. The error signal output of capstan servo 51 is clamped to ground through contacts K–21C and K–23B to provide a nominal speed error signal reference to the capstan drive motor 32. Contact K–8C opens and contact K–8D closes to apply the capstan servo output to the input of this servo as a reference for comparison to the tachometer signal derived from the tachometer pickup 39. At the same time contact K–8E closes to cause the control track head 44 to record tachometer pulses derived from the tachometer pickup 39. The resulting "assemble" splice is as illustrated in FIGURE 4, wherein the full line recorded signal pulses of the control track 83 denote the original control track, while the dashed line pulses denote the new control track which is recorded concurrently with the new signal by the control track head, commencing at the transition between the existing recorded material and assembled new material. Point Z, at which recording of the new control track commences, was adjacent the control track head at the instant the servo control relay K–8 was energized. This point is spaced downstream from point X since the control track head is physically displaced in the direction of tape movement from the helical scanning assembly 22 of the recording and reproducing apparatus 17. It will be appreciated that there is no discontinuity between the original control track and newly recorded control track, and accordingly no loss of synchronism at the transition.

Termination of the "assemble" mode is initiated by momentary closure of edit record switch S–10 which causes the impulse relay contacts K–24A and B to open. As a result, bias is removed from the logic circuitry and all relay contacts revert to their normal positions, thereby terminating the "assemble" editing operation.

In order to splice together a number of recorded segments to provide a complete edited master tape, a control track is preferably first pre-recorded on the master tape. Thereafter, the "long insert" mode is employed to record the segments on the master tape in a continuous manner with slight overlap between successive segments at the edited transitions. Phase continuity at the transitions is obtained by virtue of the capstan and head drum servos of the recording and reproducing apparatus 17 being maintained in the playback mode and thus being controlled by the pre-recorded control track.

Although the invention has been hereinbefore described with reference to a preferred embodiment. it will be appreciated that numerous modifications and changes may be made therein without departing from the true spirit and scope of the invention. For example, the relays employed in the logic circuitry of the editing system are to be taken as being purely illustrative, it being possible to substitute solid state electronic switches, or equivalent means therefor. The term "relay means" in therefore to be taken as including any switching device having a circuit closing or opening switching mechanism operated in response to energization of an actuating element. Thus, it is not intended to limit the invention except by the terms of the following claims.

What is claimed is:

1. An electronic editing system for helical scan video tape recorder of the type including tape supply and take-up reels mounted for rotation on a deck, a helical scanning assembly mounted on said deck having a guide for guiding magnetic tape extending between said supply and take-up reels in a helical path about a rotary head drum having at least one video FR head mounted thereon, a capstan mounted on said deck for moving said tape between said supply and take-up reels, a capstan motor coupled in driving relation to said capstan, a head drum motor coupled in driving relation to said head drum, tachometer means driven by said drum for generating tachometer pulses representative of drum position, a video erase head mounted on said deck transverse to said tape at a position displaced upstream from said scanning assembly, a video record section coupled to said video RF heads to apply a video signal for recording to said RF heads upon energization of said record section, an erase oscillator coupled to said video erase head to apply erase current thereto upon energization of said oscillator, a head drum servo coupled to said head drum motor for controlling same in accordance with a head drum error signal developed by comparison of signals at first and second input thereof, a capstan servo coupled to said capstan motor for controlling same in accordance with a capstan error signal developed by comparison of signals at first and second inputs thereof, and a control track head mounted on said deck at a position adjacent said tape to record a control track on or playback a control track from said tape, said editing system comprising an editing mode selector switch means having selectable "normal," "short insert," "long insert," and "assemble" mode positions, edit record switch means coupled to said mode selector switch means to upon actuation apply triggering impulses to the selected positions thereof, and logic circuitry coupling said mode selector switch means to said video record section, erase oscillator, head drum servo, capstan servo, tachometer, and control track head, said logic circuitry including means normally connecting said tachometer means to the first input of said head drum servo and the second input thereof to a reference source and means normally connecting said first and second inputs of said capstan servo respectively to said tachometer means and said control track head, said mode selector switch means in said "normal" position decoupling said edit record switch from said logic circuitry, said logic circuitry including means interconnected in said "short insert" position of said mode selector switch means to in response to a first of said triggering impulses energize said video record section and in response to a second of said impulses de-energize said video record section, said logic circuitry including means interconnected in said "long insert" position of said mode selector switch means to in response to a first of said impulses substantially simultaneously energize said video record section and said videa erase oscillator and in response to a second of said impulses de-energize said video erase oscillator and after a predetermined time delay de-energize said video record section, said logic circuitry including means interconnected in said "assemble" position of said selector switch means to in response to a first of said impulses substantially simultaneously energize said video record section and said video erase oscillator, connect said second input of said head drum servo to a source of vertical sync from said video signal for recording, connect the output of said capstan servo to a nominal speed reference potential, connect said second input of said capstan servo to said output thereof, and disconnect said control track head from said second input of said capstan servo and connect said control track head to said tachometer means, and in response to a second of said impulse de-energize said video record section and said video erase oscillator and reconnect said second input of said head drum servo to said reference source, disconnect said output of said capstan servo from said nominal speed reference potential, disconnect said second input of said capstan servo from said output thereof, and disconnect said control track head from said tachometer means and reconnect said control track head to said second input of said capstan servo.

2. An electronic editing system according to claim 1, further defined by said logic circuitry including first relay means having an actuating element and associated normally open circuit switching mechanisms for closing circuits responsive to energization of said actuating element, energizing bias means, a first of said switching mechanisms coupling said bias means to said video record section, second relay means having an actuating element and associated normally open circuit switching mechanisms, a first of switching mechanisms of said second relay means coupling said bias means to the actuating element of said first relay means, said selector switch means have a plurality of banks each including "normal," "short insert," "long insert," and "assemble" position contacts and an associated selector movable between said contacts, said selectors of the respective banks movable in unison, said edit record switch means coupling said bias means to the selector of a first of said banks, third relay means having an actuating element and associated normally open switching mechanisms alternately closing and opening in response to successive energizations of said actuating element of said third relay means, said actuating element of said third relay means commonly coupled to said "short insert," "long insert," and "assemble" contacts of said first bank, a first of said switching mechanisms of said third relay means coupling said bias means to the selector of a second of said banks, fourth relay means having an actuating element and associated normally open switching mechanisms said actuating element of said fourth relay means connected to said "short insert" contact of said second bank, a first of said switching mechanisms of said fourth relay means coupling said bias means to said actuating element of said second relay means, delay means coupling said "long insert" contact of said second bank to said actuating element of said fourth relay means to maintain energization thereof for said predetermined delay following de-energization of the delay means, means connecting said "long insert" contact of said second bank to the "long insert" contact of a third of said banks, means connecting the selector of said third bank to said video erase oscillator, fifth relay means having an actuating element and associated normally open switching mechanisms, said actuating element of said fifth relay means commonly connected to said "assemble" contacts of said second and third banks, a first of said switching mechanisms of said fifth relay means coupling said selector of said second bank to said actuating element of said fourth relay means, a second of said switching mechanisms of said fifth relay means and a second of said switching mechanisms of said first relay means serially connecting the output of said capstan servo to said nominal speed reference potential, and sixth relay means having an actuating element and associated normally open and normally closed switching mechanisms, said actuating element of said sixth relay means connected to the "assemble" contact of a fourth of said banks, the selector of said fourth bank connected in series with said first switching mechanism of said first relay means, a first of said normally open switching mechanisms of said sixth relay means coupling said second input of said head drum servo to said source of vertical sync, a first of said normally closed switching mechanisms of said sixth relay means coupling said second input of said head drum servo to said reference source, a second of said normally open switching mechanisms of said sixth relay means coupling the output of said capstan servo to said second input thereof, a second of said normally closed switching mechanisms of said sixth relay means, coupling said control track head to said second input of said capstan servo, a third of said normally open switching mechanisms of said sixth relay means coupling said control track head to said tachometer means.

3. An electronic editing system according to claim 2, further defined by second delay means coupling said first switching mechanism of said second relay means to said actuating element of said first relay means to delay energization thereof for a predetermined time delay.

4. An electronic editing system according to claim 2, further defined by an edit indicator lamp having a predetermined discharge threshold potential, a fifth of said banks having the "short intert," "long insert," and "assemble" contacts thereof commonly connected to said bias means, a resistor coupling the selector of said fifth bank to said edit indicator lamp, said second relay means having a normally closed switching mechanism connected in parallel with said resistor, a capacitor, a second of said normally open switching mechanisms of said second relay means in series with a second of said switching mechanisms of said third relay means connecting said capacitor in parallel with said edit indicator lamp, a video record lamp, and a third of said normally open switching mechanisms of said second relay in series with a third of said normally open switching mechanisms of said first relay means connecting said video record lamp to said bias source.

5. An electronic editing system according to claim 2, further defined by said delay means comprising transistor amplifier means coupling said "long insert" contact of said second bank to said actuating element of said second relay means, and a variable resistance and a capacitor in parallel connected to the input of said amplifier means, said variable resistance set in conjunction with said capacitor to establish a time constant commensurate with the maintenance of a potential in excess of the cut-off potential of said amplifier means for a time equal to that required for movement of said tape between said video erase head and said head drum.

6. An electronic editing system according to claim 1, wherein said recorder includes an audio record section, said editing mode selector switch means has a plurality of banks each including "normal," "short insert," "long insert," and "assemble" position contacts, said selectors of the respective banks being movable in unison, an audio mode selector switch is provided having first and second banks each including "video only," video+audio channel 1," "video+audio channel 2," and "video+audio channels 1 and 2" position contacts and an associated selector movable between said contacts, said selectors of said banks of said audio mode selector switch being movable in unison, said contacts of said first bank of said audio mode selector switch connected to said audio record section to apply energizing bias thereto in selectable predetermined controlling relationships in response to the application of bias to the selector of said first bank of said audio mode selector switch, and said logic circuitry comprises energizing bias means, means connecting said edit record switch means between said bias means and the selector of a first of said banks of said editing mode selector switch means, an impulse relay having an actuating element and first and second contacts, said actuating element of said impulse relay connected between said "short insert", "long insert", and "assemble" contacts of said first bank of said editing mode selector switch means in common and ground, said first contacts of said impulse relay coupling said bias means to the selector of a second of said banks of said editing mode selector switch means, a holding relay having an actuating element and a plurality of normally open contacts and a normally closed contact, said actuating element of said holding relay connected to said "short insert" contact of said second bank of said editing mode selector switch means, a delay circuit coupling said "long insert" contact of said second bank of said editing mode selector switch means to said actuating element of said holding relay ,said relay circuit maintaining energization of said holding relay for a predetermined time delay subsequent to de-energization of the delay circuit, said predetermined time delay being selected to correspond to the time required for said tape to move between said video erase head and the point of said scanning assembly at which said RF heads begin scanning said tape, an assemble relay having an actuating element and a plurality of normally open contacts, said actuating element of said assemble relay connected to said "assemble" contact of said second bank of said editing mode selector switch means, said "assemble" contact and said "long insert" contact of said second bank of said editing mode selector switch means respectively connected to the "assemble" contact and "long insert" contact of a third bank of said editing mode selector switch means, said selector of said third bank connected to said video erase oscillator, a first of said contacts of said assemble relay coupled between said selector of said second bank of said editing mode selector switch means and said holding relay, a record relay having an actuating element and a plurality of normally opentacts, a first of said normally open contacts of said holding relay coupling said bias means to said actuating element of said record relay, a delay record relay having an actuating element and a plurality of normally open contacts, a second delay circuit, a first of said contacts of said record relay in series with said second delay circuit coupling said bias means to said actuating element of said delay record relay, said second delay circuit delaying energization of said delay record relay for a predetermined time subsequent to energization of said second relay circuit, a first of said contacts of said delay record in series with said first contact of said record relay coupling said bias means to said video record section and to the selector of a fourth of said banks of said editing mode selector switch means, a second of said contacts of said delay record relay coupling said bias means to said first bank of said audio mode selector switch, edit, video record, audio channel 1 record, and audio channel 2 record indicator lamps each having a predetermined discharge thershold potential, means commonly coupling said bias means to the "short insert", "long insert", and "assemble" contacts of a fifth bank of said editing mode selector switch means, a resistor connected between said selector of said fifth bank and a first side of said edit indicator lamp the second side of which is connected to ground, a capacitor, a second of said contacts of said impulse relay and a second of said normally open contacts of said holding relay in series coupling said capacitor in parallel with said edit indicator lamp, a first normally closed contact of said holding relay connected in parallel with said resistor, a first diode, a third normally open contact of said holding relay in series with a third normally open contact of said delay record relay and said first diode coupling said bias means to a first side of said video record lamp the second side of which is connected to ground, means connecting the junction between said first diode and said video record lamp to the selector of the second bank of said audio mode selector switch, said audio channel 1 record lamp connected between said "video+audio channel 1" contact and ground, said audio channel 2 record lamp connected between said "video+audio channel 2" contact and ground, a second diode connected between said "video+audio channels 1 and 2" contact and said "video+audio channel 1" contact, a third diode connected between said "video+audio channels 1 and 2" contact and said "video+audio channel 2" contact, and a servo control relay having an actuating element and normally open and normally closed contacts, said actuating element of said servo control relay connected to said "assemble" contact of said fourth bank, a first of said normally open contacts of said servo control relay coupling said second input of said head drum servo to said source of vertical sync, a first of said normally closed contacts of said servo control relay coupling said second input of said head drum servo to said reference source, a second of said normally open contacts of said servo control relay coupling the output of said capstan servo to said second input thereof, a second of said normally closed contacts of said servo control relay coupling said control track head to said second input of said capstan servo, a third of said normally open contacts of said servo control relay coupling said control track head to said tachometer means, a fourth of said contacts of said delay record relay and a second of said contacts of said assemble relay in series coupling said output of said capstan servo to ground.

References Cited

UNITED STATES PATENTS 3,342,932 9/1967 Bounsall.
3,364,306 1/1968 Brown.

ROBERT L. GRIFFIN, *Primary Examiner.*

H. W. BRITTON, *Assistant Examiner.*

U.S. Cl. X.R.

179—100.2